July 23, 1929.  J. H. CRARY  1,722,201
INTERNAL COMBUSTION ENGINE
Filed Feb. 16, 1928

WITNESSES

INVENTOR
James H. Crary
BY
ATTORNEY

Patented July 23, 1929.

1,722,201

UNITED STATES PATENT OFFICE.

JAMES H. CRARY, OF NEW YORK, N. Y.

INTERNAL-COMBUSTION ENGINE.

Application filed February 16, 1928. Serial No. 254,843.

This invention relates to internal combustion engines and more particularly to internal combustion engines of the two-cycle type.

An object of the invention is to provide an engine in which air alone is utilized as a scavenging medium, and fuel, as rich as desired, is forced into the air and mixed therewith and compressed in the cylinder before firing.

A further object is to provide in an engine of this type an air exhaust valve which is preferably manually controlled so as to permit a variation of the volume and pressure of air in the cylinder so as to control the speed and power of the engine.

A further object is to provide an engine of this character in which a single piston of two diameters compresses both air and fuel supplied to the lower portion of the cylinder and crank case respectively.

With these and other objects in view, the invention consists in certain novel features of construction and combinations and arrangements of parts, which will be more fully hereinafter described and pointed out in the claims.

In the the accompanying drawings—

Figure 1:
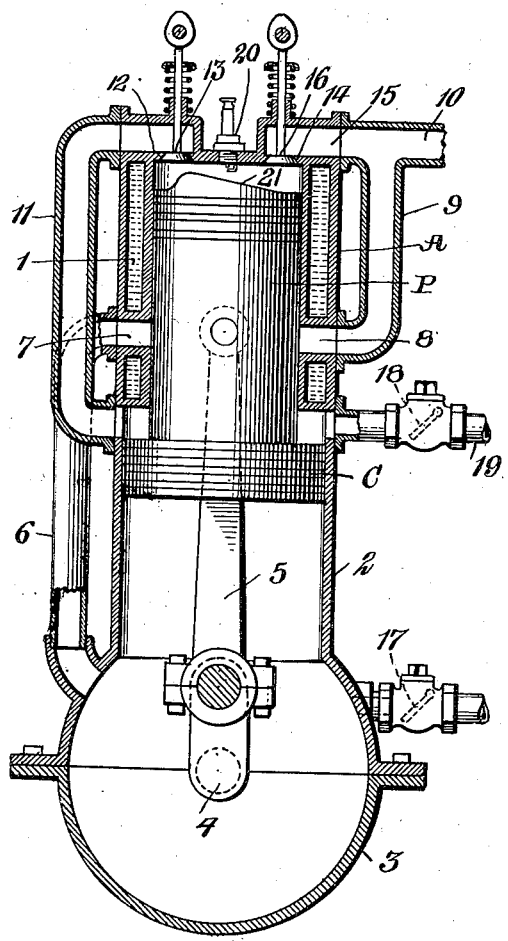
Figure 1 is a view, mainly in longitudinal section but partly in elevation, showing the parts in firing position.
Figure 2:
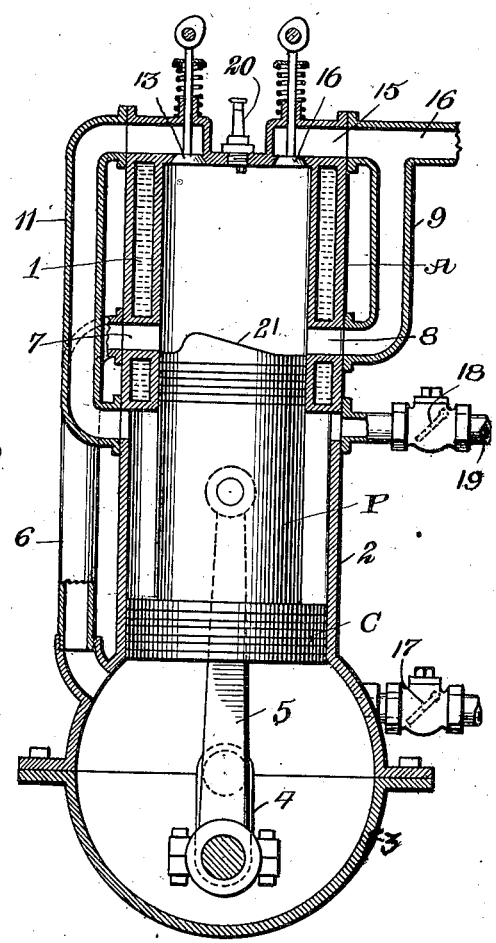
Figure 2 is a similar view showing the piston at the other extremity of its stroke, which is the fuel exhaust position.

A represents a cylinder of two different internal diameters, the upper, smaller diametered portion of the cylinder being preferably water jacketed, as shown at 1. P represents a piston which fits and reciprocates in the upper, smaller diametered end of the cylinder A, and at its lower end is of an enlarged diameter, forming a compression piston C, which fits and reciprocates within the larger, lower end 2 of cylinder A.

In employing these terms "upper" and "lower" it is to be distinctly understood that they are used with reference to the drawings, and as the engine may of course be operated in various positions the terminology is employed for convenience only.

The lower end 2 of the cylinder A is secured to and communicates directly with a crank case 3 in which a crank shaft 4 is mounted, and said crank shaft 4 is connected to the piston P by a connecting rod 5. The crank case 3 is connected by a pipe 6 with an air inlet port 7 in the wall of the cylinder A and this air inlet port 7 is preferably in alinement with or in the same plane as an exhaust port 8 in the opposite side of the cylinder which communicates with an exhaust pipe 9 discharging into an exhaust manifold 10.

A pipe 11 connects the upper portion of the larger diametered end 2 of cylinder A with a fuel inlet port 12 in the end of the cylinder A, and a mechanically operated valve 13 controls the opening and closing of this fuel inlet port 12.

An air exhaust port 14 is also provided in the end of the cylinder A and communicates with a passage 15 in direct communication with the exhaust manifold 10 although it is to be distinctly understood that the air and gas may have independent outlets instead of a common outlet as illustrated.

The air outlet port 14 is provided with a valve 16 which is manually controlled, and of course I do not wish to limit myself to any particular means whereby this manual manipulation of the valve may be had as I may employ any suitable means for the purpose.

In any event it is to be understood that the valves 13 and 16 are normally closed, the former being opened automatically and mechanically by the operation of the engine and the latter being opened and closed at the will of the operator.

17 represents a check valve, permitting a flow of air to the crank case 3 and preventing any movement of the air in the opposite direction past said valve, and 18 represents a check valve which permits an inlet of fuel to the upper end of the lower portion 2 of cylinder A. This check valve 18 is located within a pipe 19 which may be connected to a carburetor or any other source of fuel supply.

20 represents an ordinary spark plug located at the upper end of the cylinder A, and the upper end of the piston P is given a somewhat compound curvature, as illustrated at 21, so as to deflect the incoming air and direct the exhaust gases to more perfectly scavenge the engine than would be the result with a straight or flat end piston.

The operation is as follows:

Figure 1 shows the piston in firing position. When the compressed charge in the upper end of the cylinder is fired the pressure will force the piston P downwardly imparting a rotary motion to the crank shaft 4, and this downward motion of the piston will, through the medium of the enlarged end or compression piston C, compress air in the crank case 3.

This downward movement of the enlarged end of the compression piston C will also suck fuel into the upper end of the cylinder section 2. As the piston nears the lower end of its stroke it will gradually uncover the air inlet port 7 and the exhaust port 8 so that the air which has been compressed in the crank case 3 will be forced into the cylinder and force out the burnt gases thus thoroughly scavenging the engine through the medium of the air only.

As the piston moves upwardly it will of course close the air inlet port 7 and the exhaust port 8 and will compress the air which is entrapped in the cylinder, and when the cylinder reaches a predetermined position on its upper stroke the fuel inlet valve 13 will open and the fuel will be forced into the cylinder due to the upward movement of the piston or, more specifically, the upward movement of the enlarged end of compression piston C, and this valve will then close and the compression will be completed when the piston again reaches the position shown in Figure 1, when the next explosion takes place.

The function of the air outlet valve 16 is primarily to regulate or control the pressure of air in the cylinder before any fuel is admitted to the cylinder so that by relieving this pressure of air the speed and power of the engine may be varied and, as above stated, this valve is manually controlled so the operator can control the operation of the engine by permitting air to escape. The valve may of course be mechanically controlled and set for best operation, and manual control may be dispensed with.

It is this broad idea of a control valve allowing escape of air at the will of the operator which constitutes the broad idea of my invention and I therefore do not wish to be limited to the specific arrangement and construction set forth but desire to cover the idea broadly through the means of any mechanical or other means which may be utilized for the purpose, nor do I wish to be limited to the exact arrangement of air and fuel passages as the invention may be modified in many ways in these particulars.

It is therefore to be understood that various changes and alterations might be made in the general form and arrangement of the parts described without departing from the invention and hence I do not limit myself to the precise details set forth but consider myself at liberty to make such changes and alterations as fairly fall within the spirit and scope of the appended claims.

I claim:

1. In a two-cycle internal combustion engine, the combination with a cylinder and a reciprocating piston in the cylinder, said cylinder having an exhaust port and an air inlet port both of which are uncovered by the piston on its down stroke, a positively operated exhaust valve controlling a port in the cylinder, said exhaust valve opened simultaneously with the uncovering of said first-mentioned ports whereby the incoming air will completely displace the burnt gases and the timing of the said exhaust valve will govern the speed of the engine, and a positively operating inlet valve in the cylinder controlling the admission of a rich fuel mixture into the cylinder on the upstroke of the piston after the exhaust valve has closed.

2. In a two-cycle internal combustion engine, the combination with a cylinder and a reciprocating piston in the cylinder, said cylinder having an exhaust port and an air inlet port, both of which are uncovered by the piston on its down stroke, a positively operated exhaust valve controlling a port in the cylinder, said exhaust valve opened simultaneously with the uncovering of said first-mentioned ports whereby the incoming air will completely displace the burnt gases and the timing of the said exhaust valve will govern the speed of the engine, and a positively operating inlet valve in the cylinder controlling the admission of a rich fuel mixture into the cylinder on the upstroke of the piston after the exhaust valve has closed, both of said valves being located in the head of the engine.

3. In a two-cycle internal combustion engine, the combination with a cylinder and a reciprocating piston in the cylinder, said cylinder having an exhaust port and an air inlet port, both of which are uncovered by the piston on its down stroke, a positively operated exhaust valve controlling a port in the cylinder, said exhaust valve opened simultaneously with the uncovering of the said first-mentioned ports whereby the incoming air will completely displace the burnt gases and the timing of the said exhaust valve will govern the speed of the engine, and a positively operating inlet valve in the cylinder controlling the admission of a rich fuel mixture into the cylinder on the upstroke of the piston after the exhaust valve has closed, said exhaust valve capable of manual timing.

4. In a two-cycle internal combustion engine, the combination with a cylinder and a reciprocating piston in the cylinder, said cylinder having an exhaust port and an air inlet port both of which are uncovered by the piston on its down stroke, a positively operated exhaust valve controlling a port in the cylinder, said exhaust valve opened simultaneously with the uncovering of said first-mentioned ports, whereby the incoming air will completely displace the burnt gases, and the timing of the said exhaust valve will govern the speed of the engine, a positively operated inlet valve in the cylinder controlling the admission of a rich fuel mixture into the cylinder on the upstroke of the piston after the exhaust valve has closed, a crank case connected to the cylinder and to an air pressure chamber, an enlarged end of said piston constituting a compression piston, and means for admitting air to the crank case and a rich mixture to the cylinder above the compression piston, said compression piston functioning to compress both the air and the rich fuel mixture and force them into the cylinder.

Signed at New York, in the county of New York and State of New York, this 14th day of February, A. D. 1928.

JAMES H. CRARY.